United States Patent
Erayan et al.

(10) Patent No.: US 9,156,434 B2
(45) Date of Patent: Oct. 13, 2015

(54) WEBBING EXIT PROTECTION BOOT FOR A WEBBING OF A SEAT BELT AND SEAT BELT SYSTEM

(71) Applicant: Ford Global Technologies, LLC, Dearborn, MI (US)

(72) Inventors: Mert Erayan, Istanbul (TR); Burak Firlar, Istanbul (TR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/067,079

(22) Filed: Oct. 30, 2013

(65) Prior Publication Data

US 2014/0124606 A1    May 8, 2014

(30) Foreign Application Priority Data

Nov. 5, 2012   (EP) ..................................... 12191228

(51) Int. Cl.
*B60R 22/18*   (2006.01)

(52) U.S. Cl.
CPC ......... *B60R 22/18* (2013.01); *B60R 2022/1843* (2013.01)

(58) Field of Classification Search
CPC ............ B60R 22/18; B60R 2022/1818; B60R 2022/1843; B60R 22/03
USPC ................ 297/468, 482, 483; 280/801.1, 808
See application file for complete search history.

(56) References Cited

U.S. PATENT DOCUMENTS

| | | | | |
|---|---|---|---|---|
| 3,287,063 | A * | 11/1966 | Nicholas | 297/475 |
| 3,291,526 | A * | 12/1966 | Nicholas | 280/807 |
| 3,455,603 | A * | 7/1969 | Nicholas | 297/475 |
| 3,572,832 | A * | 3/1971 | Graham et al. | 297/475 |
| 3,811,703 | A * | 5/1974 | Turkovich | 297/474 |
| 4,400,015 | A * | 8/1983 | Ryu | 280/807 |
| 4,431,233 | A * | 2/1984 | Ernst | 297/468 |
| 6,428,106 | B1 * | 8/2002 | Andersson | 297/483 |
| 6,585,289 | B1 | 7/2003 | Hammer et al. | |
| 7,874,581 | B2 * | 1/2011 | Itoga | 280/733 |
| 8,016,362 | B2 * | 9/2011 | Itoga | 297/471 |
| 2008/0012417 | A1 | 1/2008 | Okazaki et al. | |

FOREIGN PATENT DOCUMENTS

| | | |
|---|---|---|
| DE | 2433281 A1 | 1/1976 |
| DE | 2442630 A1 | 3/1976 |
| DE | 8315256 U1 | 12/1983 |
| WO | 8401299 A1 | 4/1984 |
| WO | 9902368 A1 | 1/1999 |

* cited by examiner

*Primary Examiner* — Ruth Ilan
(74) *Attorney, Agent, or Firm* — Vichit Chea; Price Heneveld LLP

(57) ABSTRACT

A webbing exit protection boot for a webbing of a vehicle seat belt has an aperture for the webbing, a stiff lower part confining a lower section of the aperture at least in part and a flexible upper part confining an upper section of the aperture.

17 Claims, 2 Drawing Sheets

WEBBING EXIT PROTECTION BOOT FOR A WEBBING OF A SEAT BELT AND SEAT BELT SYSTEM

FIELD OF THE INVENTION

The present invention generally relates to vehicle seat belts, and more particularly to a webbing exit protection boot for a webbing of a seat belt and a seat belt system.

BACKGROUND OF THE INVENTION

Webbing exit protection boots for seat belts in vehicles like passenger cars, commercial vehicles or trucks are typically used to protect and guide the seat belt and the webbing, respectively close to the lower anchor point. At the anchor point the seat belt is connected to the vehicle body or the like. The lower anchor point and the initial progress of the seat belt are usually covered by a hard trim part. For such designs the webbing proceeds through a cutout of the hard trim part.

Commonly used are so-called cover-on slice designs which allow routing of the seat belt webbing through a hard trim integrated cutout. Although this solution ensures a minimal cutout when the seat belt is at its stored position some applications like, for example, a commercial vehicle rear row seat belt require a larger routing envelope from the lower anchorage point.

A further solution is the so-called stapled sleeve design providing webbing protection by a cover attached to a lower part of the webbing. This design, however, generally is not suitable for hard trims due to the large exposed cutout section around the protective sleeve. Such cutout is typically open for dirt collection and see-through issues.

Examples of vehicle seat belt systems are disclosed in the following publications. WO 99/02368 discloses a guide for a seat belt webbing with an escutcheon for passing the webbing, wherein the escutcheon is received by a mounting attached to a seat frame. U.S. Patent Application Publication No. 2008/0012417 A1 shows a cover for a webbing which extends along the backside of a seat from the upper end of the backrest to the seat cushion. U.S. Pat. No. 6,585,289 B1 discloses a seat belt system with an inflatable section which is arranged inside an outer belt section. G 83 15 256 shows a guide for the webbing with a slot for guiding the webbing and an edge lining with a low friction coefficient. DT 24 33 281 A1 discloses a protection device for a seat belt which covers the edge(s) of the webbing.

It would be desirable to improve the guidance of a seat belt webbing.

SUMMARY OF THE INVENTION

According to one aspect of the present invention, a webbing exit protection boot for a webbing of a seat belt is provided. The webbing exit protection boot for a webbing of a seat belt includes an aperture for the webbing, a stiff lower part confining a lower section of the aperture at least in part, and a flexible upper part confining an upper section of the aperture.

According to another aspect of the present invention, a seat belt system includes a webbing, an anchor point for attachment of the webbing, a hard trim part covering at least the anchor point, and a webbing exit protection boot comprising an aperture for the webbing, a stiff lower part confining a lower section of the aperture at least in part, and a flexible upper part confining an upper section of the aperture.

According to a further aspect of the present invention, a vehicle seat belt system is provided including a webbing, an anchor point attached to the webbing, a hard trim part substantially covering the anchor point, and a webbing exit protection boot comprising a stiff lower part substantially confining a lower section of an aperture and a flexible upper part substantially confining an upper section of the aperture, wherein the webbing extends through the aperture.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the following detailed description, reference is made to the accompanying drawings which form a part hereof and in which are shown by way of illustration specific embodiments in which the invention may be practiced. In this regard, directional terminology, such as "top" or "bottom" etc. is used with reference to the orientation of the figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
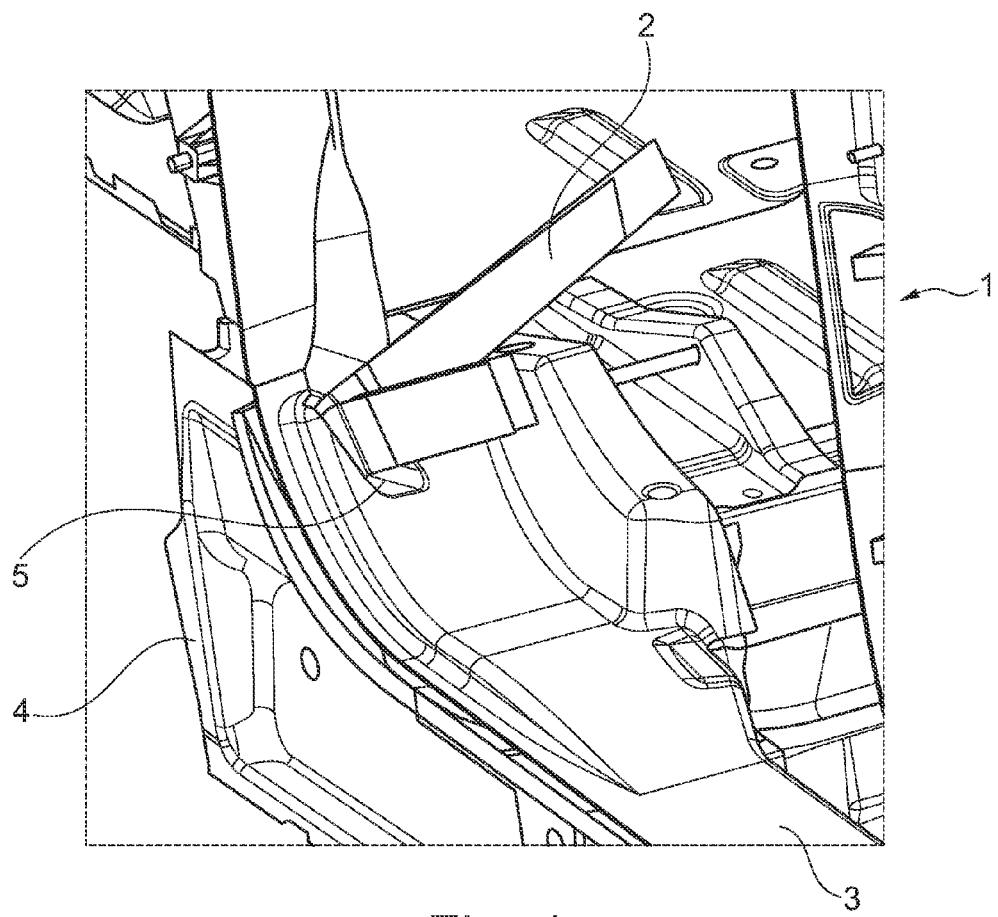
FIG. 1 shows a perspective view of a seat belt webbing exit through a hard trim, according to one embodiment.

FIG. 1 shows a view inside a passenger compartment of a vehicle, especially the rear row seat. The seat is not shown for sake of clarity. The seat belt system 1 is shown with a webbing 2 which projects out of a hard trim part 3. The hard trim part 3 according to one embodiment consists of a stiff material and covers part of the vehicle body 4 so that the vehicle body 4 is neither accessible nor visible from the passenger compartment. Through a slot or an opening 5, the webbing 2 contracts out of the hard trim part 3 into the passenger compartment. The opening 5 is open and relatively large to ensure a large webbing run envelope. Underneath the hard trim 3 the seat belt system 1 is anchored at the vehicle body 4 or a similar stable part.

Figures 2, 3:
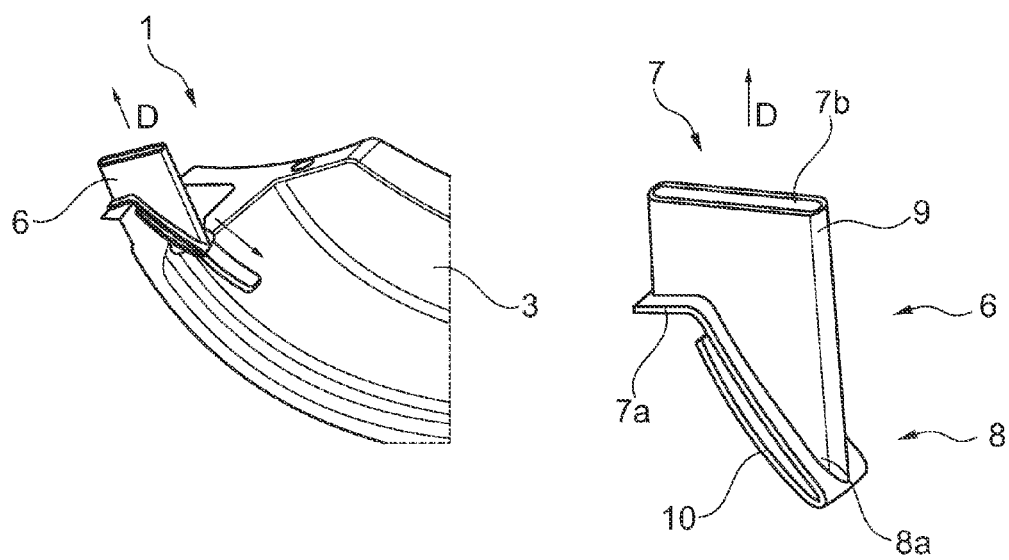
FIG. 2 shows a webbing exit protection boot with a hard trim part according to one embodiment.
FIG. 3 shows a webbing exit protection boot according to one embodiment.

FIG. 2 shows one embodiment of part of the seat belt system 1 in greater detail. Here, a webbing exit protection boot 6 and the hard trim part 3 are shown. The hard trim part 3 can be associated to the seat belt system 1 or to other parts like for example the vehicle body 4. The webbing exit protection boot 6 guides the webbing 2 and protects in a crash from the hard trim part 3. Further, the webbing exit protection boot 6 avoids see-through issues and dirt collection.

In connection with FIG. 3 the structure of the webbing exit protection boot 6 is described in greater detail. The webbing exit protection boot 6 has an aperture 7 for the webbing 2 which is orientated basically vertical or at an angle with regard to the vertical orientation. The width and depth or the cross section of the aperture 7 is chosen such that the webbing 2 can move easily but no excessive clearance between webbing 2 and aperture 7 is present.

A lower section 7a of the aperture 7 is at least in part limited by a stiff lower part 8 of the webbing exit protection boot 6. This implies that the lower opening or the lower section 7a of the aperture is arranged in the lower part 8. Here, the lower part 8 is orientated at an angle of approximately 45° with regard to an exit direction D. Along the exit direction D proceeds the movement of the webbing 2. Further, the exit direction D may align to a central axis of the webbing 2.

An upper section 7b of the aperture 7 is limited by a flexible upper part 9 of the webbing exit protection boot 6. This implies that the upper opening or the upper section 7b of the aperture is arranged in the upper part 9. Here, the upper part 9 is orientated at an angle of approximately 90° with regard to the exit direction D.

The upper part 9 and the lower part 8 are integrally formed for example out of a synthetic material. Here, the upper section 7b and the lower section 7a are developed in a chimney form with different angles or orientations with regard to the exit direction D. Both upper and lower sections 7b and 7a may be arranged in the same or in different orientations.

The stiff or at least in comparison to the upper part 9 stiffer lower part 8 has or consists of a surface 8a in the middle of which a part of the lower section 7a of the aperture 7 is defined. The surface or area 8a is orientated at an angle of approximately 45° to the exit direction D. The left upper part of the lower section 7a shown in FIG. 3 is delimited by the flexible upper part 9. It is also possible to extend the lower part 8 into this region so that the lower section 7a is defined completely by the lower part 8. Further, it is possible that the lower part 8 extends further in the direction of the exit direction D.

The lower part 8 has one or more fastening means or element(s) in form of a flange or flanges 10 or the like which allows a robust fixation of the webbing exit protection boot 6 at or in the hard trim part 3. Depending on the application, the fastening means or element(s) can be of another design. The flanges 10 are arranged in the range of the lower section 7a and are attached to the surface 8a or are part of the surface 8a. The surface 8a itself may be the fastening means or element 10.

With regard to FIG. 2 the interaction between the webbing exit protection boot 6 and the hard trim part 3 is further described. The hard trim part 3 has one or more fastening elements complementary to the fastening elements 10 of the webbing exit protection boot 6. The fastening element can be composed of the opening 5, an undercut not shown, or the like. The connection is slidable so that the webbing exit protection boot 6 can be slid into the hard trim part 3 easily as is shown in FIG. 3. The direction of movement is orientated generally perpendicular to the exit direction D to achieve a robust connection.

Figure 4:
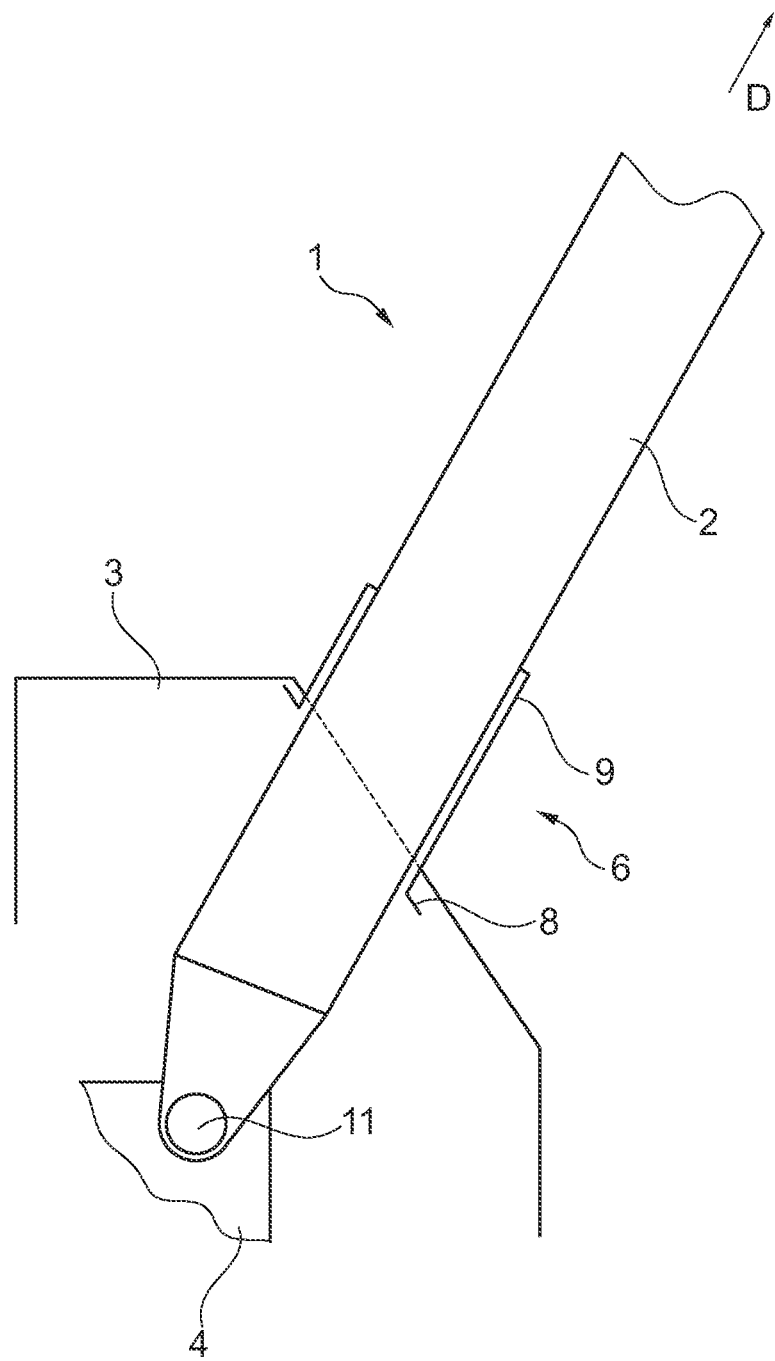
FIG. 4 shows a seat belt system and a webbing exit protection boot according to one embodiment.

FIG. 4 shows a part sectional view of the seat belt system 1. Underneath the hard trim part 3, an anchor point 11 is arranged which safely connects the webbing 2 with a robust part like the body work 4. From there, the webbing 2 extends in the direction of the exit direction D into the passenger compartment of the vehicle.

In the area of the hard trim part 3, the webbing 2 enters into the webbing exit protection boot 6 so that the webbing 2 has neither contact to the under or inner side nor to the upper or outer side of the hard trim part 3. The webbing exit protection boot 6 protects the webbing 2 from the hard trim part 3 even in front and side vehicle crashes. By the stiff lower part 8, the webbing exit protection boot 6 is firmly attached to the hard trim part 3 while the flexible upper part 9 ensures good guidance, a large envelope and further protection of the webbing 2.

The modular and functional distinct design of the webbing exit protection boot 6 with the stiff lower part 8 for attachment and the flexible upper part 9 for guidance allows easy adaptation of the webbing exit protection boot 6 and the seat belt system 1 to difficult applications like for example a hard trim part 3 being located far from the anchor point 11.

The seat belt system 1 includes here the webbing 2, the anchor point 11, the hard trim part 3 and the webbing exit protection boot 6. However, the seat belt system 1 can be defined in a different manner, the anchor point 11 and/or the hard trim part 3 for example may be excluded from the seat belt system.

The webbing exit protection boot for a webbing of a seat belt has an aperture for the webbing, a stiff lower part confining a lower section of the aperture at least in part and a flexible upper part confining an upper section of the aperture. The webbing exit protection boot ensures with its stiff lower part good connection, protection of the webbing for all kind of crashes as well as dirt and see-through protection. The flexible upper part guarantees good guidance of the webbing, easy ingress and egress and see-through protection. Production, installation and service are cost-effective. The webbing exit protection boot is ideal for difficult cases having for example the lower anchor point with serious distance to the hard trim part like for a commercial vehicle rear row seat. Even in this application the webbing exit protection boot ensures with its modular design a large webbing run envelope. Concurrently, the webbing exit protection boot ensures protection of the webbing especially at side and front crashes while still offering see-through protection from the interior in direction of the anchor point and underneath the seat, respectively.

The aperture usually stretches in a direction approximately vertical. At the top it is limited by the flexible upper part especially in form of a slot. The upper part may have a certain height or length to cover part of the webbing. This enhances protection and guidance of the webbing. The stiff or firm lower part can be adapted to the vehicle's conditions, especially to the hard trim part. The lower section or the lower opening of the aperture does not necessarily need to be completely defined or surrounded by the lower part.

The webbing exit protection boot protects the webbing from surrounding parts of the hard trim part and completely avoids see-through issues.

The upper section may be orientated substantially perpendicular to an exit direction and the lower section may be orientated to the exit direction at an angle. The exit direction corresponds to the routing direction and a longitudinal axis of the webbing, respectively. The angle of the lower section can be in the range of superior zero degrees to less than ninety degrees. The lower section can be divided in several sectors each having different angles in order to adapt to a hard trim part.

The lower part and the upper part may be integrally formed. This eases handling and stock keeping. The lower part may comprise a fastening element as a fastening or mounting means. One or more fastening or mounting elements can attach the webbing exit protection boot for example to a hard trim part or a covering of the seat and/or the vehicle body. As the lower part is stiff a durable connection is ensured. The fastening element may comprise a flange in the area of the lower section. The flange or flanges simple attachment by a sliding movement of the webbing exit protection boot is possible. The seat belt system has a webbing, an anchor point for attachment of the webbing, a hard trim part covering at least the anchor point and a webbing exit protection boot as described above. The same advantages and modifications as described above apply here as well.

The fastening element may be formed complementary to a further fastening element of the hard trim part. This enables a simple and tailor-made connection which withstand crashes and protects the webbing efficiently.

The fastening element may be slidable and releasable connected which enables simple fastening by a sliding movement. The direction of movement of the sliding elements and of the sliding elements itself can be orientated approximately perpendicular to the aperture. This allows for good fixation of the webbing exit protection boot during ingress and egress of the webbing.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A webbing exit protection boot for a webbing of a seat belt comprising:
   an aperture for the webbing;
   a stiff lower part defining at least a portion of a lower opening of the aperture;
   a flexible upper part defining an upper opening of the aperture;
   a surface extending outwardly from adjacent the lower opening; and
   a flange extending from an edge of the surface with a portion extending along and in proximity thereto.

2. The webbing exit protection boot according to claim 1, wherein the upper part is oriented substantially perpendicular to an exit direction, and wherein the lower part is oriented to the exit direction at an angle.

3. The webbing exit protection boot according to claim 1, wherein the lower part and the upper part are integrally formed.

4. The webbing exit protection boot according to claim 1, wherein the flange is a fastening element.

5. The webbing exit protection boot of claim 1, wherein the aperture terminates at the lower opening of the lower part.

6. The webbing exit protection boot of claim 1, wherein the lower opening includes a first portion oriented at an angle with respect to an exit direction of the aperture and a second portion that is oriented perpendicular to the exit direction.

7. The webbing exit protection boot of claim 6, wherein the angle is about 45 degrees.

8. A seat belt system comprising:
   a webbing;
   an anchor point for attachment of the webbing;
   a hard trim part covering at least the anchor point; and
   a webbing exit protection boot comprising an aperture for the webbing, a stiff lower part defining at least a portion of a lower opening of the aperture, a flexible upper part defining an upper opening of the aperture, a surface extending outwardly from the lower section of the aperture, and a flange extending from the surface adjacent the opening and complementary with the hard trim part.

9. The seat belt system according to claim 8, wherein the flange comprises a first fastening element that is positioned complementary to a second fastening element of the hard trim part.

10. The seat belt system according to claim 9, wherein the first fastening element and the second fastening element are slidably and releasably connected.

11. The seat belt system according to claim 8, wherein the upper part is oriented substantially perpendicular to an exit direction, and wherein the lower part is oriented to the exit direction at an angle.

12. The seat belt system according to claim 8, wherein the lower part and the upper part are integrally formed.

13. The seat belt system according to claim 8, wherein the flange is a fastening element.

14. A vehicle seat belt system comprising:
    a webbing;
    an anchor point attached to the webbing;
    a hard trim part substantially covering the anchor point; and
    a webbing exit protection boot comprising a stiff lower part defining at least a portion of a lower opening of an aperture, a flexible upper part defining an upper opening of the aperture, wherein the webbing extends through the aperture, a surface extending outwardly from the lower section of the aperture, and a flange coupled with an edge of the surface and extending in a direction generally parallel to the surface in proximity thereto, the flange being complementary with the hard trim part.

15. The vehicle seat belt system of claim 14, wherein:
    the aperture defines a width and a depth in directions perpendicular to an exit direction thereof, the width being greater than the depth; and
    the direction in which the flange extends has at least a component parallel to the width of the aperture.

16. The vehicle seat belt system of claim 14, wherein the flange is an arm that is integrally coupled with the surface.

17. The vehicle seat belt system of claim 14, wherein:
    the hard trim part defines an opening;
    the lower opening of the webbing exit protection boot is aligned with the opening of the hard trim part; and
    the flange is complementary with the opening of the hard trim part.

* * * * *